United States Patent
Nagaraja

(10) Patent No.: US 8,964,667 B2
(45) Date of Patent: *Feb. 24, 2015

(54) AIR INTERFACE SELECTION BETWEEN NODES IN PEER-TO-PEER/AD-HOC NETWORKS

(75) Inventor: Nagendra Nagaraja, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/472,393

(22) Filed: May 15, 2012

(65) Prior Publication Data
US 2012/0224509 A1    Sep. 6, 2012

Related U.S. Application Data

(63) Continuation of application No. 12/276,837, filed on Nov. 24, 2008, now Pat. No. 8,194,600.

(51) Int. Cl.
| | | |
|---|---|---|
| H04W 4/00 | (2009.01) | |
| H04W 36/34 | (2009.01) | |
| H04W 76/02 | (2009.01) | |
| H04W 36/00 | (2009.01) | |
| H04W 84/18 | (2009.01) | |

(52) U.S. Cl.
CPC ........ H04W 76/023 (2013.01); *H04W 36/0066* (2013.01); *H04W 76/021* (2013.01); *H04W 84/18* (2013.01)
USPC ............................ 370/329; 370/338; 370/341

(58) Field of Classification Search
None
See application file for complete search history.

(56) References Cited

U.S. PATENT DOCUMENTS

| | | | |
|---|---|---|---|
| 8,194,600 B2 | 6/2012 | Nagaraja | |
| 2005/0020299 A1* | 1/2005 | Malone et al. | 455/552.1 |
| 2005/0054346 A1 | 3/2005 | Windham et al. | |
| 2005/0249121 A1 | 11/2005 | Matsunaga | |
| 2006/0277298 A1* | 12/2006 | Kim et al. | 709/224 |
| 2007/0001853 A1 | 1/2007 | Otranen | |
| 2007/0074108 A1 | 3/2007 | Xie et al. | |
| 2007/0153747 A1 | 7/2007 | Pan et al. | |

(Continued)

FOREIGN PATENT DOCUMENTS

| | | |
|---|---|---|
| CN | 1549613 A | 11/2004 |
| CN | 1802835 A | 7/2006 |

(Continued)

OTHER PUBLICATIONS

International Search Report—PCT/US09/065148—International Search Authority—Mar. 17, 2010.

(Continued)

*Primary Examiner* — Chi H Pham
*Assistant Examiner* — Soon-Dong D Hyun
(74) *Attorney, Agent, or Firm* — Jeffrey Jacobs

(57) ABSTRACT

Aspects describe pairs of nodes negotiating air interfaces in a peer-to-peer and/or ad hoc network. The negotiation can take into account the capability of each node. The negotiation can be performed on a default link and after negotiation, the nodes can facilitate a communication handoff to the negotiated link. Further, one or more nodes can support multiple air interfaces, wherein nodes that support multiple air interfaces can establish more than one air interface with peer nodes over similar air interfaces or over different air interfaces as a function of negotiation between the nodes.

20 Claims, 7 Drawing Sheets

(56) References Cited

U.S. PATENT DOCUMENTS

| | | |
|---|---|---|
| 2007/0204021 A1 | 8/2007 | Ekl et al. |
| 2007/0214379 A1* | 9/2007 | Abraham et al. ............... 714/4 |
| 2008/0112519 A1* | 5/2008 | Jung et al. .................. 375/350 |
| 2008/0192666 A1 | 8/2008 | Koskan et al. |
| 2008/0220878 A1 | 9/2008 | Michaelis |
| 2009/0083429 A1* | 3/2009 | Krig ............................. 709/228 |
| 2009/0103486 A1 | 4/2009 | Hunukumbure et al. |
| 2009/0310545 A1 | 12/2009 | Tateson et al. |
| 2009/0319640 A1* | 12/2009 | Kugel ........................... 709/220 |
| 2010/0014455 A1* | 1/2010 | Oulai et al. .................. 370/328 |
| 2010/0128697 A1 | 5/2010 | Choi-Grogan |
| 2010/0182929 A1 | 7/2010 | Abraham et al. |
| 2010/0262682 A1* | 10/2010 | Dunn et al. ................. 709/221 |
| 2010/0281427 A1* | 11/2010 | Ghosh et al. ............... 715/811 |
| 2012/0069736 A1* | 3/2012 | Hargrave et al. ........... 370/230 |
| 2012/0076112 A1* | 3/2012 | Olvera-Hernandez et al. ............................ 370/331 |
| 2013/0250898 A1* | 9/2013 | Rudolf et al. ............... 370/329 |

FOREIGN PATENT DOCUMENTS

| | | |
|---|---|---|
| CN | 101233699 A | 7/2008 |
| EP | 1633104 A1 | 3/2006 |
| TW | 200412805 | 7/2004 |
| WO | 2008103988 A2 | 8/2008 |

OTHER PUBLICATIONS

Panken F., et al., "Extending 3G/WiMAX networks and services through residential access capacity" [Wireless broadband access] IEEE Communications Magazine, IEEE Service Center, Piscataway, US, vol. 45 No. 12, Dec 1, 2007, pp. 62-69, ISSN: 0163-6804.
Taiwan Search Report—TW098139994—TIPO—Oct. 19, 2012.
Written Opinion—PCT/US2009/065148—ISA/EPO—Mar. 17, 2010.

\* cited by examiner

AIR INTERFACE SELECTION BETWEEN NODES IN PEER-TO-PEER/AD-HOC NETWORKS

CROSS-REFERENCE TO RELATED APPLICATIONS

This application is a continuation of U.S. patent application Ser. No. 12/276,837 filed 24 Nov. 2008, which is hereby incorporated by reference, as if set forth in full in this document, for all purposes.

BACKGROUND

I. Field

The following description relates generally to communication networks and more particularly to peer-to-peer and/or ad hoc networks.

II. Background

Wireless communication systems are widely deployed to provide various types of communication. For example, voice, data, video and so forth can be provided through wireless communication systems. A typical wireless communication system, or network, can provide multiple users access to one or more shared resources. For example, a system may use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Wireless communication networks are commonly utilized to communicate information regardless of where a user is located (inside or outside a structure) and whether a user is stationary or moving (e.g., in a vehicle, walking). Generally, wireless communication networks are established through a mobile device communicating with a base station or access point. The access point covers a geographic range or cell and, as the mobile device is operated, the mobile device can be moved in and out of these geographic cells.

A network can also be constructed utilizing solely peer-to-peer devices without utilizing access points or the network can include both access points (infrastructure mode) and peer-to-peer devices. These types of networks are sometimes referred to as ad hoc networks. Ad hoc networks can be self-configuring whereby when a mobile device (or access point) receives communication from another mobile device, the other mobile device is added to the network. As mobile devices leave the area, they are dynamically removed from the network. Thus, the topography of the network can be constantly changing.

In centralized networks (e.g., CDMA IS-95, Global System for Mobile Communications (GSM), WCDMA, and so forth), a single air interface is utilized. Ad-hoc networks do not have a dedicated infrastructure to control the network, however, it has been typical for ad-hoc networks to be modeled using a single air interface across the network, which is not very efficient.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with selection of an air interface in a peer-to-peer and/or ad hoc network. Nodes can negotiate an air interface on a default link and can switch to the negotiated air interface (if different from the default link) for continued communication between the nodes. Further, nodes can support multiple air interfaces and can be connect to two or more peer nodes. These node pairs can be over a similar air interface and/or over different air interfaces.

An aspect relates to a mobile device that includes a processor that executes computer executable instructions stored on a computer-readable medium. The instructions include establishing a connection with a peer node over a first link that includes at least two air interface identifications and a ranking provided by the mobile device and negotiating with the peer node a second link from the at least two air interface identifications. The negotiation is a function of the ranking. The instructions also include selectively handing off communication from the first link to the second link to continue communication with the peer node.

Another aspect relates to a wireless communications apparatus that includes a memory and a processor. The memory retains instructions related to establishing a connection with a peer node over a first link that includes at least two air interface identifications and a ranking provided by the wireless communications apparatus. The first link can be a default link. The memory also retains instructions related to negotiating with the peer node a second link from the at least two air interface identifications. The negotiation is a function of the ranking. Further, the memory retains instructions related to selectively handing off communication from the first link to the second link to continue communication with the peer node. The processor is coupled to the memory and is configured to execute the instructions retained in the memory.

Yet another aspect relates to a wireless communications apparatus that enables air interface selection. The apparatus includes means for establishing communication with a peer node over a first link that includes at least two air interface identifications and a ranking provided by the wireless communications apparatus. The first link is a default link. The apparatus also includes means for negotiating with the peer node a second link from the at least two air interface identifications. The negotiation is a function of the ranking. Additionally, apparatus includes means for selectively handing off communication from the first link to the second link to continue communication with the peer node in an ad hoc network.

Still another aspect relates to a computer program product that includes a computer-readable medium. The computer-readable medium includes a first set of codes for causing a computer to establish communication with a peer node over a first link that includes at least two air interface identifications and a ranking. The computer-readable medium also includes a second set of codes for causing the computer to negotiate with the peer node a second link from the at least two air interface identifications. The negotiation is a function of the ranking. Further, the computer-readable medium includes a third set of codes for causing the computer to selectively handoff communication from the first link to the second link to continue communication with the peer node.

A further aspect relates to at least one processor configured to facilitate an air interface selection between a node pair. The processor includes a first module for establishing a connection with a peer node over a first link that includes at least two air interface identifications and a ranking and a second module for negotiating with the peer node a second link from the at least two air interface identifications. The negotiation is a function of the ranking. The processor also includes a third module for selectively handing off communication from the first link to the second link to continue communication with the peer node in an ad hoc communication network.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of the various aspects may be employed. Other advantages and novel features will become apparent from the following detailed description when considered in conjunction with the drawings and the disclosed aspects are intended to include all such aspects and their equivalents.

DETAILED DESCRIPTION

Figure 1:
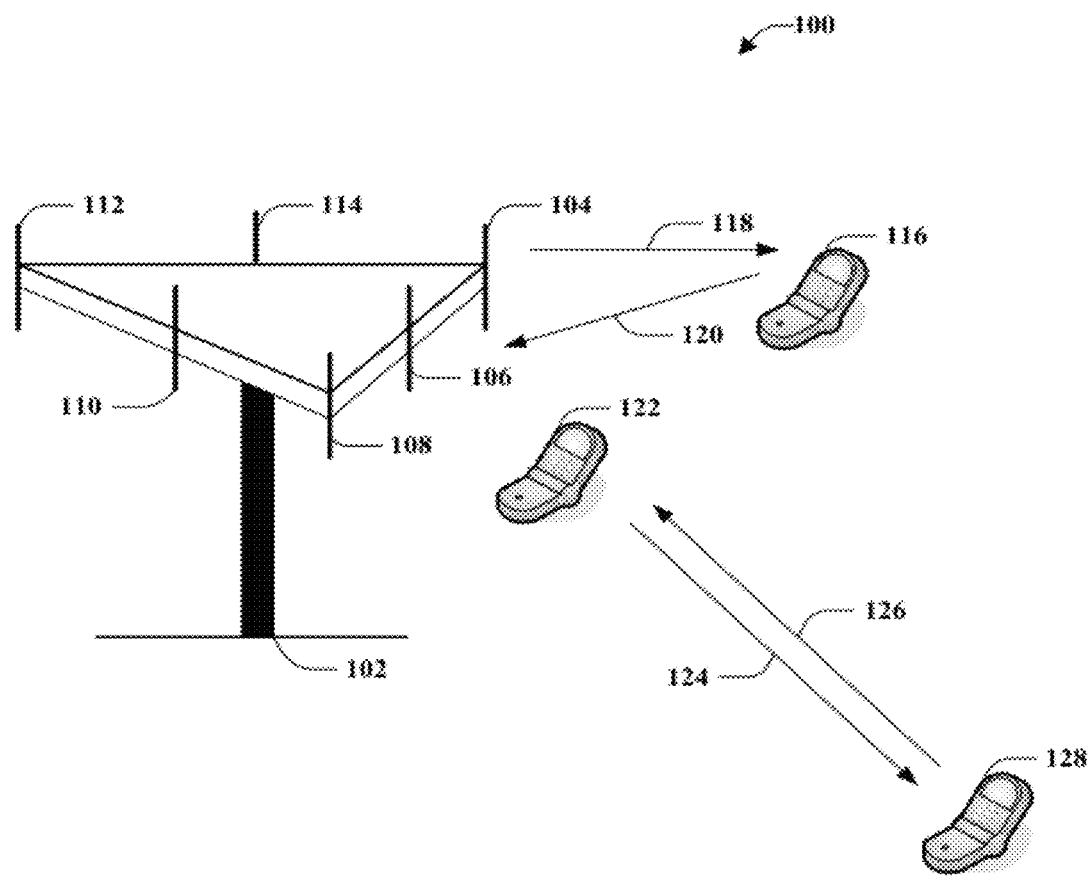
FIG. 1 illustrates a wireless communication system in accordance with various aspects presented herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a mobile device. A mobile device can also be called, and may contain some or all of the functionality of a system, subscriber unit, subscriber station, mobile station, mobile, wireless terminal, node, device, remote station, remote terminal, access terminal, user terminal, terminal, wireless communication device, wireless communication apparatus, user agent, user device, or user equipment (UE). A mobile device can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station may be utilized for communicating with wireless terminal(s) and can also be called, and may contain some or all of the functionality of, an access point, node, Node B, e-NodeB, e-NB, or some other network entity.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Additionally, in the subject description, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete manner.

Referring now to FIG. 1, a wireless communication system 100 is illustrated in accordance with various aspects presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a multitude of components associated with signal transmission and reception (e.g., processors, modulators, multiplexers, demodulators, demultiplexers, antennas, etc.), as will be appreciated by one skilled in the art. Additionally, the base station 102 can be a home base station, a Femto base station, and/or the like.

Base station 102 can communicate with one or more mobile devices such as mobile device 116; however, it is to be appreciated that base station 102 can communicate with substantially any number of mobile devices similar to mobile device 116. As depicted, mobile device 116 is in communication with antennas 104 and 106, where antennas 104 and 106 transmit information to mobile device 116 over a forward link 118 and receive information from mobile device 116 over a reverse link 120.

In addition, mobile devices 122 and 128 can be communicating with one another, such as in a peer-to-peer configuration. Moreover, mobile device 122 is in communication with mobile device 128 using similar links 124 and 126. In a frequency division duplex (FDD) system, forward link 118 can utilize a different frequency band than that used by reverse link 120, for example. Further, in a time division duplex (TDD) system, forward link 118 and reverse link 120 can utilize a common frequency band.

In a peer-to-peer ad hoc network, devices within range of each other, such as devices 122 and 128, communicate directly with each other without a base station 102 and/or a wired infrastructure to relay their communication. Additionally, peer devices or nodes can relay traffic. The devices within the network communicating in a peer-to-peer manner can function similar to base stations and relay traffic or communications to other devices, functioning similar to base stations, until the traffic reaches its ultimate destination. The devices can also transmit control channels, which carry information that can be utilized to manage the data transmission between peer nodes.

A communication network can include any number of mobile devices or nodes that are in wireless communication. Each node can be within range of one or more other nodes and can communicate with the other nodes or through utilization of the other nodes, such as in a multi-hop topography (e.g., communications can hop from node to node until reaching a final destination). For example, a sender node may wish to communicate with a receiver node. To enable packet transfer between sender node and receiver node, one or more intermediate nodes can be utilized. It should be understood that any node can be a sender node and/or a receiver node and can perform functions of either sending and/or receiving information at substantially the same time (e.g., can broadcast or communicate information at about the same time as receiving information).

System 100 can be configured to establish a link between multi-air interfaced peers (e.g., devices 122 and 128) in an ad hoc wireless network. Centralized networks (e.g., CDMA, GSM, WCDMA, OFDMA) have an infrastructure and standards built around a single air interface. On the other hand, peer-to-peer networks do not utilize a centralized infrastructure. The disclosed aspects provide support of multiple types of air interfaces between peers and selection of an adequate air interface between peers, wherein both peers agree upon the air interface based on each peer's requirements, capabilities, and so forth (e.g., type of bandwidth requirement). In accordance with some aspects, centralized networks can be supported.

The disclosed aspects can provide true ad-hoc networks with a best possible air interface between node pairs or between multiple node pairs (e.g., node A pairs over a first interface with node B and node A pairs over a second interface with node C). Further, the disclosed aspects can provide higher network throughput by providing a protocol to allow nodes to select a correct type of air interface according to various parameters, such as bandwidth type, the necessary amount of bandwidth, and/or the available type of air interface between the network nodes.

Figure 2:
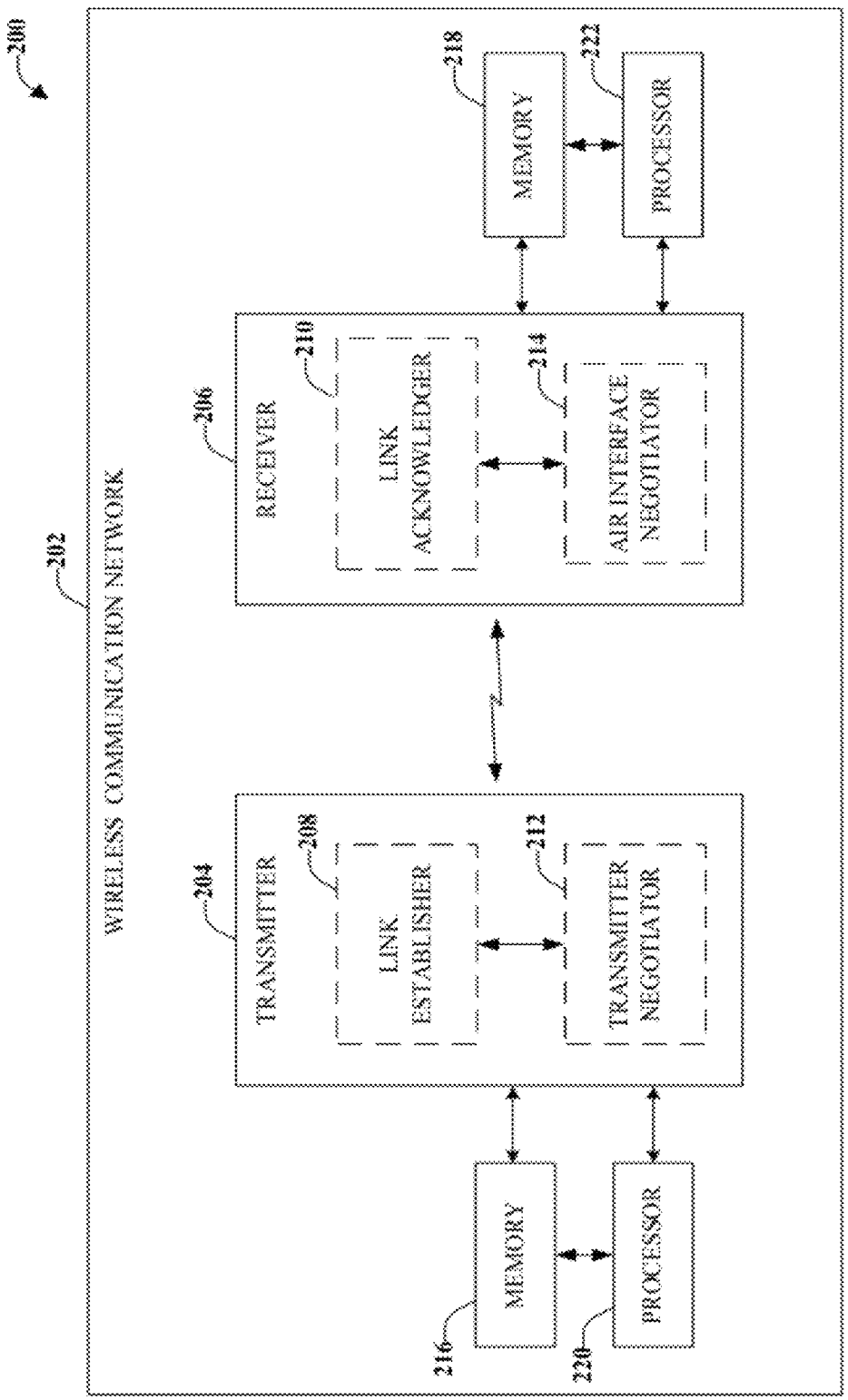
FIG. 2 illustrates a system that allows peer nodes in a peer-to-peer and/or ad hoc network to negotiate links based on parameters associated with the peer nodes, according to an aspect.

FIG. 2 illustrates a system 200 that allows peer nodes in a peer-to-peer and/or ad hoc network to negotiate air interface links based on parameters associated with the peer nodes, according to an aspect. Peer nodes, such as mobile devices, can support multiple air interfaces. In peer-to-peer networking and/or mobile ad hoc networking, nodes should utilize the best possible link (e.g., air interface) to communicate with other nodes. In an ad hoc network, peer nodes might not communicate utilizing the same interface between the different sets of peer nodes. For example, if an ad hoc network has nodes A1, A2, A3, and A4, each pair of nodes (e.g., node pair A1 and A2, node pair A2 and A3, node pair A1 and A4, and so forth) can have different air links that might be better for communication between the pairs. System 200 can facilitate selection of the best possible communication air links through a negotiation process conducted between peer nodes.

System 200 can be utilized in a communication network 202 that can be an ad hoc communication network and/or a peer-to-peer communication network. These types of networks might not have a centralized base station that provides a link between nodes, such as a single air interface. There can be one or more nodes in communication network 202, such as transmitter node 204 and receiver node 206. Although a number of transmitter(s) 204 and receiver(s) 206 can be included in wireless network 202, as will be appreciated, a single transmitter 204 that transmits communication data signals to a single receiver 206 is illustrated for purposes of simplicity.

Further, it should be appreciated that although the aspects are described with reference to a transmitter 204 and a receiver 206, a single node (transmitter 204 and/or receiver 206) can concurrently transmit and receive data, can transmit and receive data at different times, or combinations thereof. Further, a transmitter 204 and/or receiver 206 can initiate a communication link and/or receive a request for initiation of communication, according to an aspect. Transmitter 204 and/or receiver 206 can be mobile devices, such as devices 116, 122 and 128 of FIG. 1.

A peer-to-peer network provides flexibility in that the nodes 204, 206 do not have to communicate over a single interface. The transmitter 204 and receiver 206 can have different preferred interfaces or a common preferred interface. To exploit this flexibility, the nodes can negotiate a link or air interface over which communications between the nodes should be conducted.

Included in transmitter 204 is a link establisher 208 that is configured to establish a communication link with receiver 206. This link can be a default link that is established between the nodes within the communication network 202. In accordance with some aspects, the default link is a pre-established link that is already known by the nodes. This single default air interface for link negotiation can have a low (or very low) bandwidth and a high reliability. In some cases, the air interface can provide enough capability to negotiate a link. Peer nodes 204, 206 can first interact utilizing this default air interface.

Receiver node 206 includes a link acknowledger 210 that is configured to receive the request to establish the link and accept the link, if the link should be established. If establishment of the link is not to be enabled, the receiver 206 can ignore the request and/or transmit a failure message to transmitter 204.

All air interfaces are provided an identification such as A, B, C, D, and so forth, and air interface selection algorithms Algo1, Algo2, Algo3, Algo4, and so forth. The connection is established utilizing this default link automatically.

The transmitter node 204 (e.g., the peer that requested the network) includes a transmitter negotiator 212 that is configured to transmit an air interface ID and associated algorithm to negotiate the air interface, which are received at the receiver 206. The ID of the air interface is common across the peers (e.g., transmitter 204 and receiver 206). Thus, receiver 206 can understand the types of interfaces sending peer (e.g., transmitter 204) supports.

Since receiver 206 also receives the type of algorithm, it should utilize a similar algorithm to calculate the best air interface that is available to both peers (e.g., transmitter 204 and receiver 206). This calculation or determination can be performed by an air interface negotiator 214.

In accordance with some aspects, a ranking of the link IDs is exchanged between transmitter 204 and receiver 206. For example, the devices can include OFDM, GSM, Bluetooth, Wi-Fi, or other communication technologies. The ranking can be made based on which one of those links is the better for communication between transmitter 204 and receiver 206. In accordance with some aspects, the ranking can be a function of the distance between the nodes 204, 206 (e.g., how far apart the nodes are from each other). Additionally or alternatively, the ranking can be made based on the channel conditions of each link. In accordance with some aspects the link between nodes 204, 206 can be dynamically negotiated either periodically or it can be negotiated as a function of a condition (e.g., Signal to Interference plus Noise Ratio (SINR)) or a change in condition of an existing wireless link between nodes.

According to some aspects, the link can be dynamically negotiated if a link ranking is changed at either of the nodes. For example, the link ranking can be changed as a function of statistics obtained by either or both nodes 204, 206. The statistics can be obtained as a process of network signaling, based on proactively scanning links, based on usage of cognitive radio techniques, and so forth, or combinations thereof. For example, a cognitive radio allows a network and/or a node to change reception and/or transmission parameters in order for the network or node to achieve communication that is more efficient.

The receiver 206 sends the result of the calculation to transmitter 204 (e.g., requestor). Based on the negotiated ranking, the transmitter 204 and receiver 206 can perform a handoff from the default link to the negotiated link. If the negotiated link is the default link, a handoff does not occur (e.g., the nodes remain on the default link).

In accordance with some aspects, transmitter 204 and/or receiver 206 can have a second link with another node (e.g., a third node within communication network 202). The first link negotiated between transmitter 204 and receiver 206 can be a different link than a link negotiated with a third device (or more devices). Thus, a node (e.g., transmitter 204, receiver 206) can be utilizing two (or more) links at substantially the same time and the links can be different types of links.

System 200 can include memory 216 and 218 operatively coupled to transmitter 204 and receiver 206, respectively. Memory 216, 218 can be external to transmitter 204 (or receiver 206) or can reside within transmitter 204 (receiver 206). Memory 216, 218 can store information related to negotiating a link with a peer device in an ad-hoc network and other suitable information related to signals transmitted and received in a communication network. Memory 216, 218 can store protocols associated with air interface negotiation, taking action to control communication between transmitter 204 and receiver 206 such that system 200 can employ stored protocols and/or algorithms to achieve improved communications in a wireless ad-hoc network as described herein.

A processor 220 and 222 can be operatively connected to transmitter 204 (receiver 206) (and/or memory 216, 218) to facilitate analysis of information related to air interface negotiation in a communication network. Processor 220, 222 can be configured to execute computer executable instructions stored on a computer-readable medium. The instructions can relate to establishing a connection with a peer node over a first link that includes at least two air interface identifications and a ranking provided by the mobile device (e.g., transmitter, receiver). The instructions can also relate to negotiating a second link and handing off communication from the first link to the second link. Processor 220, 222 can be a processor dedicated to analyzing and/or generating information received by transmitter 204 (receiver 206), a processor that controls one or more components of system 200, and/or a processor that both analyzes and generates information received by transmitter 204 (receiver 206) and controls one or more components of system 200.

It should be appreciated that the data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

Figure 3:
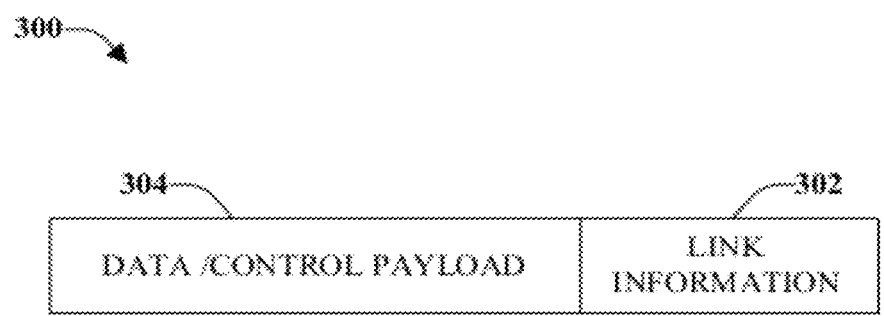
FIG. 3 illustrates an example frame structure according to the aspects disclosed herein.

FIG. 3 illustrates an example frame structure 300 according to the aspects disclosed herein. As illustrated, the frame structure 300 can include the link information 302 appended to the data/control payload 304. The link information can include various information related to the default link and/or other links (e.g., the links that are under negotiation). The link information can be exchanged between nodes (e.g., transmitter 204 and receiver 206) periodically with a frame structure, such as the illustrated frame structure 300 and/or logical channel structure. It should be understood that the frame structure 300 illustrated is for example purposes only and other frame structures can be utilized with the disclosed aspects.

In view of the exemplary systems shown and described above, methodologies that may be implemented in accordance with the disclosed subject matter, will be better appreciated with reference to the following flow charts. While, for purposes of simplicity of explanation, the methodologies are shown and described as a series of blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement the methodologies described herein. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 4:
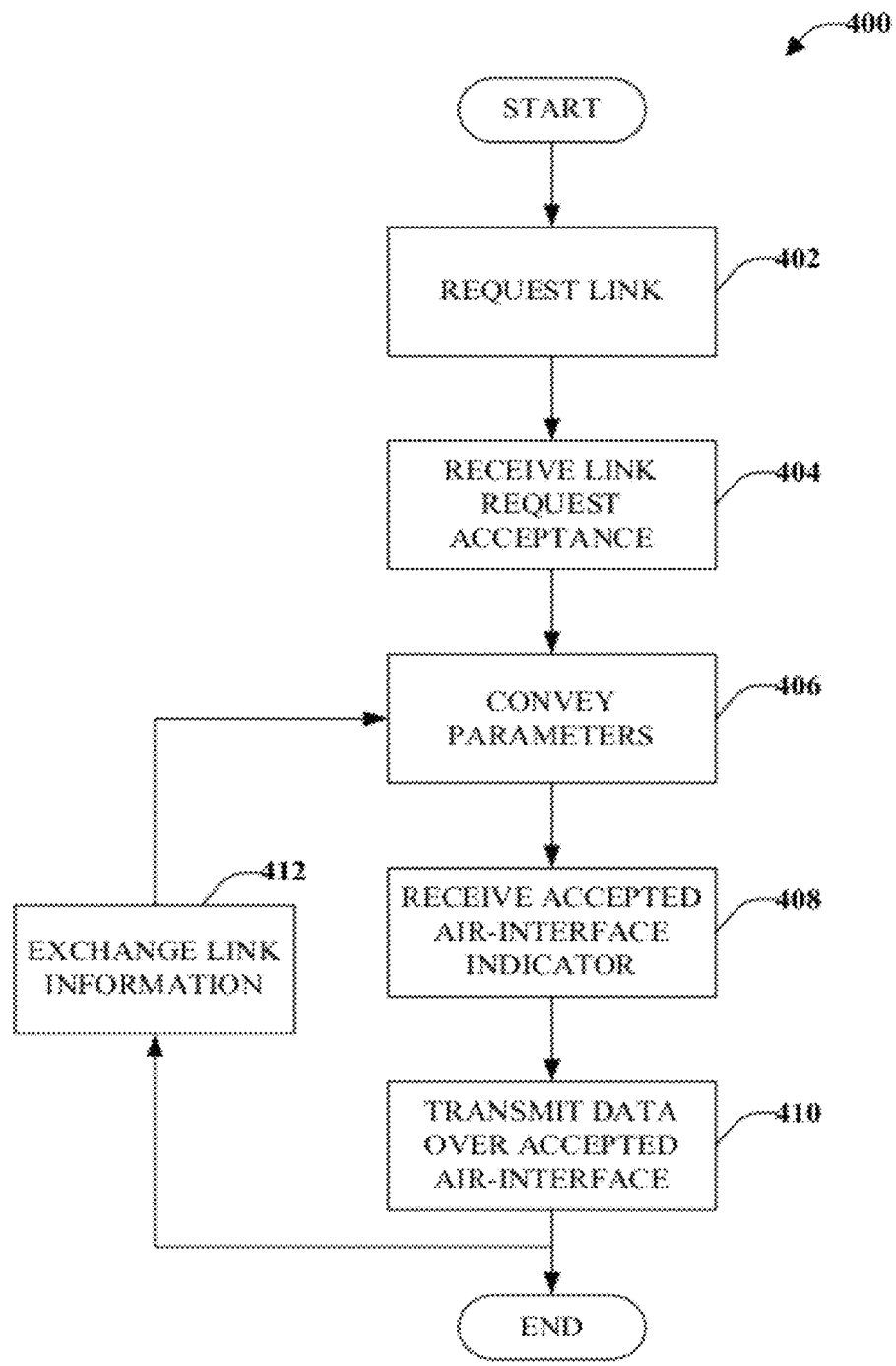
FIG. 4 illustrates a method for establishing an air interface link in a wireless ad-hoc network, according to an aspect.

FIG. 4 illustrates a method 400 for establishing an air interface link in a wireless ad-hoc network, according to an aspect. Method 400 starts, at 402, when a request for a link is transmitted from a first node to a second node, which are peer nodes. The request can be for a default link to be established with the second node. Each type of air interface can be provided with an identification (ID). For example, Bluetooth is provided with "ID A", PEANUT is provided with "ID B", and Wi-Fi is provided with "ID C" The default link can be assigned by the node requesting the communication (e.g., first node). In an example, the default link can be the most commonly utilized link by the requesting node. At 404, a link acceptance request is received from the second node if the default link is acceptable to the second node and/or the second node can support the link.

After establishment of the default link, parameters are conveyed, at 406, to the second node over the default link. These parameters can include the air interfaces supported by the first node. The parameters can also include an algorithm that can be utilized by second node to determine if the default link is acceptable or if another link should be utilized for further communications between the first node and the second node. In an example, the nodes can advertise a type of air interface and the ranking of the air interface for each node. For negotiation, the nodes can utilize a similar algorithm, method, or other technique to select the best possible link and, at 408, information related to an air-interface that should be utilized (e.g., the chosen or negotiated link) is received.

At substantially the same time as the chosen link is selected, the nodes can handoff from the default link to the selected link, if the selected link is different from the default link. This handoff can be a soft handoff and should be seamless to the nodes. In accordance with some aspects, the nodes should support the same type of handoffs of air interfaces. Data is transmitted, at 410, on the negotiated link. In such a manner, the nodes can communicate over an air interface that is adequate for both nodes.

In accordance with some aspects, link information can be exchanged, at 412, periodically or based on other criteria, such as an indication of a change in a current link. The link information can be exchanged with a particular frame structure or logical channel structure. Based on the exchanged link information, method 400 continues, at 406, where link negotiation is dynamically performed. For example, the link between nodes can be dynamically negotiated periodically or based on observed channel conditions of an existing wireless link between nodes (which might have been a previously negotiated link). If there is a change in the condition (e.g., SINR) of the existing wireless link, a new link might be negotiated and the nodes might handoff to that newly negotiated link. In accordance with some aspects, the link is renegotiated if a ranking at either of the nodes changes. For example, the ranking can be changed based on statistics received through network signaling, scanning of the link, cognitive radio techniques, or through other means.

Figure 5:
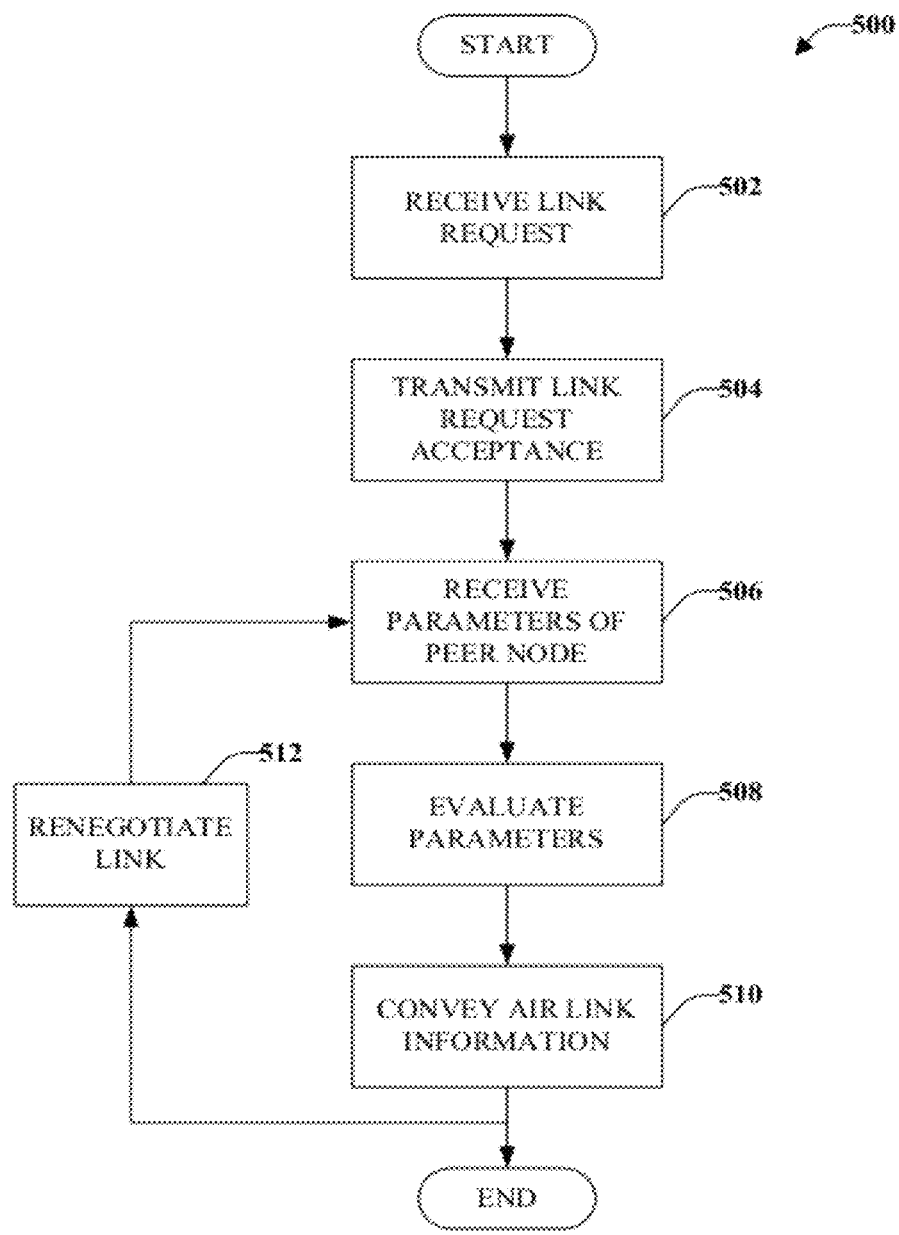
FIG. 5 illustrates a method for enabling peer nodes to negotiate links based on parameters associated with the nodes in accordance with an aspect.

FIG. 5 illustrates a method 500 for enabling peer nodes to negotiate links based on parameters associated with the nodes in accordance with an aspect. At 502, a request to establish a default link is received from a first node, which is a peer node in an ad hoc network. The request can open a communication link (e.g., default link) between the first node and a second node. If the default link can be established with the first node, an acceptance of the default link is transmitted, at 504. If the default link cannot be established, method ends.

At 506, parameters associated with the peer node are received. The parameters can include the air interface supported by the peer node. Further, the parameters can include an algorithm, method, or other technique, that can be utilized to determine whether or not a different link should be utilized and/or whether the default link is acceptable for further communications between the nodes.

Parameters associated with a receiving node are reviewed, at 508. A ranking of air interfaces in a descending order of preference (or another ranking system) can be communicated between the nodes. The nodes can negotiate the best possible air interface for each node. For example, a first node might have a ranking in the following order:

Air Interface A
Air Interface C
Air Interface B where Air Interface A is more preferred than Air Interface C, which is more preferred than Air Interface B. Further, a second node might transmit the following preference ranking:

Air Interface B
Air Interface C
Air Interface A where Air Interface B is more preferred than Air Interface C, which is more preferred than Air Interface A.

The devices can review the ranking of each other and determine, in this example, that Air Interface C is the best link for both devices. This negotiation can be conveyed between the devices as confirmation, at 510, and based on this negotiation, the nodes can handoff from the default link to Air Interface C to continue the communication between the devices.

A status of an existing link (e.g., a negotiated link) might change due to various situations and that link might no longer be adequate for either (or both) nodes. Therefore, a feedback loop can be included in method 500 and, at 512, a link is renegotiated. This renegotiation can occur periodically and/or based on a changed condition of an existing link. In accordance with some aspects, the link is renegotiated if a ranking of one of the nodes changes. In such a manner, the nodes might renegotiate an existing link and handoff to the renegotiated link if it is determined that a different link would be better for both nodes due to the changed conditions and/or that changed ranking.

Figure 6:
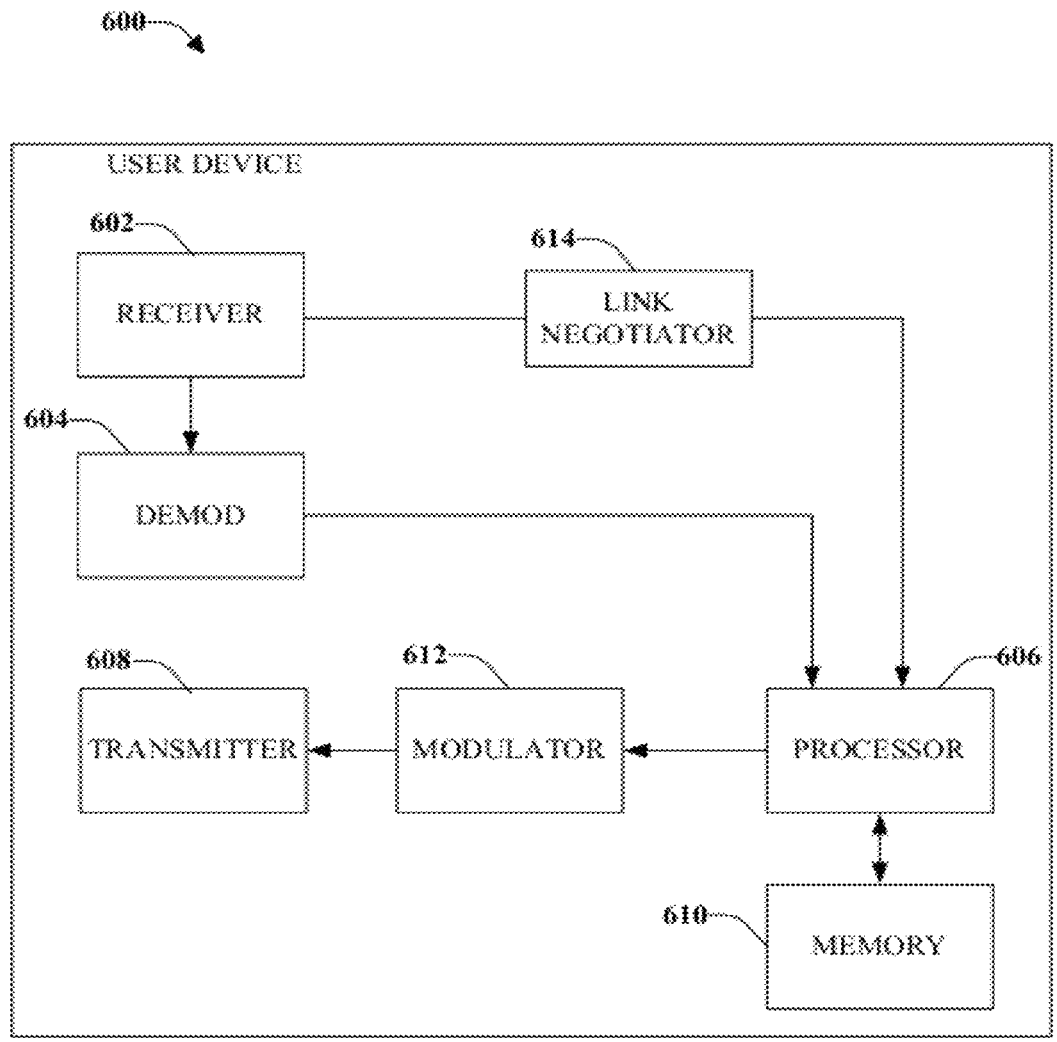
FIG. 6 illustrates a system that facilitates air interface configuration in an ad hoc network in accordance with one or more of the disclosed aspects.

With reference now to FIG. 6, illustrated is a system 600 that facilitates air interface configuration in an ad hoc network in accordance with one or more of the disclosed aspects. System 600 can reside in a user device. System 600 comprises a receiver 602 that can receive a signal from, for example, a receiver antenna. The receiver 602 can perform typical actions thereon, such as filtering, amplifying, downconverting, etc. the received signal. The receiver 602 can also digitize the conditioned signal to obtain samples. A demodulator 604 can obtain received symbols for each symbol period, as well as provide received symbols to a processor 606.

Processor 606 can be a processor dedicated to analyzing information received by receiver component 602 and/or generating information for transmission by a transmitter 608. In addition or alternatively, processor 606 can control one or more components of user device 600, analyze information received by receiver 602, generate information for transmission by transmitter 608, and/or control one or more components of user device 600. Processor 606 may include a controller component capable of coordinating communications with additional user devices.

User device 600 can additionally comprise memory 608 operatively coupled to processor 606 and that can store information related to coordinating communications and any other suitable information. Memory 610 can additionally store protocols associated with air interface management. User device 600 can further comprise a symbol modulator 612 and a transmitter 608 that transmits the modulated signal.

Receiver 602 is further operatively coupled to an encoder 614 that scrambles a Walsh Sequence with a random sequence to produce a scrambled sequence. The encoder 614 can be provided with the random sequence so that a single FHT can be utilized to decode the sequence. Additionally, receiver 602 can be operatively coupled to an allocator 616 that receive an assignment of one or more sub-sequences of the scrambled sequence. The transmitter 608 can send the scrambled sequence as an access-based handoff probe. In response to the access probe, receiver 602 can receive an Access Grant, which can be transmitted over a Shared Signaling MAC Protocol.

Receiver 602 can be configured to support multiple air interfaces and can also include a link negotiator 614 that is configured to negotiate one or more air interfaces that are adequate for receiver 602 and one or more other devices (e.g., peer devices). In such a manner, the devices can negotiate for a link that might be better than a default link and/or a link established by only one of the devices. During communication, links can be renegotiated and a handoff to a different link can occur if it is determined that a different link is preferred due to changed circumstances and/or a change to a ranked order of links.

Figure 7:
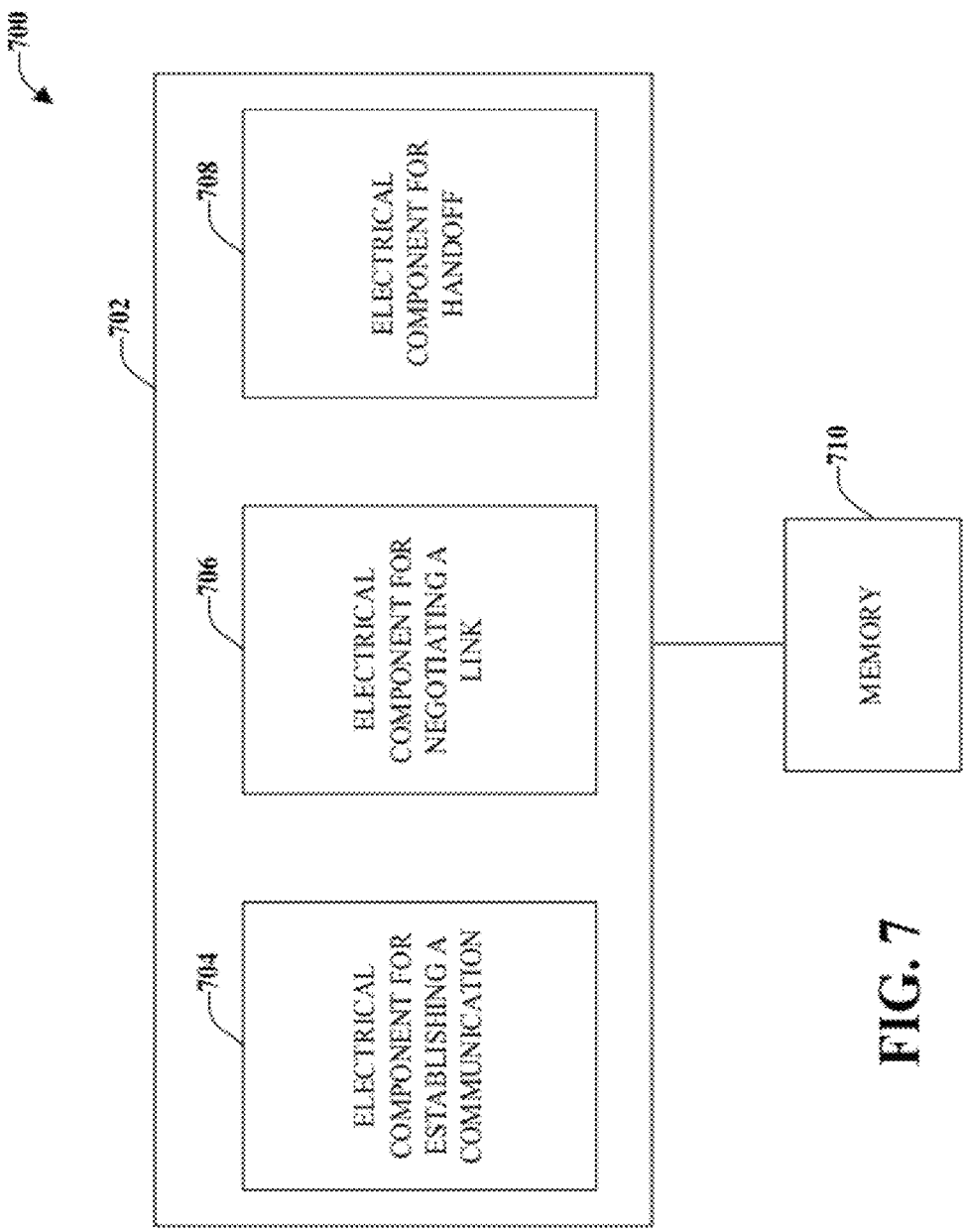
FIG. 7 illustrates an example system that facilitates negotiation of an air interface, according to an aspect.

With reference to FIG. 7, illustrated is an example system 700 that facilitates negotiation of an air interface, according to an aspect. System 700 can reside at least partially within a mobile device. It is to be appreciated that system 700 is represented as including functional blocks, which may be functional blocks that represent functions implemented by a processor, software, or combination thereof (e.g., firmware).

System 700 includes a logical grouping 702 of electrical components that can act separately or in conjunction. Logical grouping 702 can include an electrical component 704 for establishing a connection with a peer node over a first link that includes at least two air interface identifications and a ranking provided by mobile device that includes system 700. The first link is a default link and the ranking indicates the preferred order of air interfaces. The mobile device and the peer node can support similar types of handoff of air interfaces.

Also included in logical grouping 702 is an electrical component 706 for negotiating with the peer node a second link from the at least two air interface identifications. The negotiation can be a function of the ranking. In accordance with some aspects, capabilities of the mobile device and the peer node are utilized to negotiate the second link.

Further, logical grouping 702 includes an electrical component 708 for selectively handing off from the first link to the second link to enable communication with the peer node. The mobile device and the peer node communicate within an ad hoc wireless network.

In accordance with some aspects, logical grouping 702 can also include an electrical component for establishing a second connection with a second peer node over the first link and an electrical component for negotiating with the second peer node a third link from the at least two air interface identifications. The negotiation is a function of the ranking. Further, logical grouping can include an electrical component for selectively handing off from the first link to the third link to enable communication with the second peer node. The third link and the second link are different air interfaces.

In accordance with some aspects, logical grouping 702 includes an electrical component for negotiating with the peer node a third link periodically or as a function of a changed condition of the second link. Additionally or alternatively, logical grouping 702 can include an electrical component for detecting a change in a link ranking and an electrical component for negotiating with the peer node a third link as a function of the detected link ranking change. Detecting the change can include at least one of obtaining statistics based on network signaling, proactively scanning links, cognitive radio techniques, or combinations thereof. Further, logical grouping 702 can include an electrical component for the exchanging link information with the peer node periodically with a frame structure or logical channel structure.

Additionally, system 700 can include a memory 710 that retains instructions for executing functions associated with electrical components 704, 706, and 708 or other components. While shown as being external to memory 710, it is to be understood that one or more of electrical components 704, 706, and 708 may exist within memory 710.

It is to be understood that the aspects described herein may be implemented by hardware, software, firmware or any combination thereof. When implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art. Further, at least one processor may include one or more modules operable to perform the functions described herein.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal In the alternative, the processor and the storage medium may reside as discrete components in a user terminal Additionally, in some aspects, the steps and/or actions of a method or algorithm may reside as one or any combination or set of codes and/or instructions on a machine readable medium and/or computer readable medium, which may be incorporated into a computer program product.

While the foregoing disclosure discusses illustrative aspects and/or aspects, it should be noted that various changes and modifications could be made herein without departing from the scope of the described aspects and/or aspects as defined by the appended claims. Accordingly, the described aspects are intended to embrace all such alterations, modifications and variations that fall within scope of the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. A first device comprising:
   a processor configured to:
   communicate over a first link with a second device;
   receive, from the second device, a ranking indicating a preference order for link types for communication between the first device and the second device; and
   transmit a message indicating at least two link types for communication between the first device and the second device,
   wherein the processor is further configured to receive an indication from the second device selecting one of the at least two link types for communication between the first device and the second device.

2. The first device of claim 1, wherein the processor is further configured to receive an indication from the second device that communication using the at least two link types is denied.

3. The first device of claim 1, wherein the ranking comprises a ranking of links.

4. The first device of claim 3, wherein the ranking of links comprises at least two link identifiers each associated with one of the at least two link types.

5. The first device of claim 3, wherein the processor is further configured to transmit an update message indicating one or more link types to the second device.

6. The first device of claim 1, wherein the message indicating at least two link types comprises the ranking, the ranking comprising a ranking of links indicating a preference order for utilization of the at least two link types for communication with the second device.

7. The first device of claim 6, wherein the ranking of links comprises at least two link identifiers each associated with one of the at least two link types.

8. The first device of claim 1, wherein the first link comprises a near field communication link.

9. The first device of claim 1, wherein the at least two link types comprise at least two of the following link types: orthogonal frequency-division multiplexing, global system for mobile communications, Wi-Fi, code division multiplexing, frequency division multiplexing, near field communication, and Bluetooth.

10. The first device of claim 1, wherein the processor is further configured to perform a handoff to a link of at least one of the at least two link types for communication with the second device.

11. The first device of claim 10, wherein the processor is further configured to perform the handoff based on the ranking.

12. The first device of claim 10, wherein the processor is further configured to perform the handoff based on parameters of the at least two link types for communication with the second device.

13. The method of claim 10, wherein the link types for communication comprise different radio access technologies.

14. The first device of claim 1, wherein the link types for communication comprise different radio access technologies.

15. A method for communicating in a wireless network, the method comprising:
   establishing a first link for communication between a first device and a second device;
   receiving, from the second device, a ranking indicating a preference order for link types for communication between the first device and the second device;
   transmitting a message indicating at least two link types for communication between the first device and the second device; and
   receiving an indication from the second device selecting one of the at least two link types for communication between the first device and the second device.

16. The method of claim 15, further comprising receiving an indication from the second device that communication using the at least two link types is denied.

17. The method of claim 15, wherein the ranking comprises a ranking of links.

18. The method of claim 15, wherein the message indicating at least two link types comprises the ranking, the ranking comprising a ranking of links indicating a preference order for utilization of the at least two link types for communication with the second device.

19. The method of claim 15, further comprising performing a handoff to a link of at least one of the at least two link types for communication with the second device.

20. A computer program product, comprising:
   a non-transitory computer readable medium comprising:
      code for causing a computer to establish a first link for communication between a first device and a second device;
      code for causing the computer to receive, from the second device, a ranking indicating a preference order for link types for communication between the first device and the second device;
      code for causing the computer to transmit a message indicating at least two link types for communication between the first device and the second device; and
      code for causing the computer to receive an indication from the second device selecting one of the at least two link types for communication between the first device and the second device.

* * * * *